No. 632,026. Patented Aug. 29, 1899.
H. E. SMITH.
APPARATUS FOR EXAMINING DOCUMENTS.
(Application filed Mar. 23, 1899.)

(No Model.)

WITNESSES:
Herman Baumgarten
William W. Vernon.

INVENTOR
Harry Erskine Smith

UNITED STATES PATENT OFFICE.

HARRY ERSKINE SMITH, OF CHICAGO, ILLINOIS.

APPARATUS FOR EXAMINING DOCUMENTS.

SPECIFICATION forming part of Letters Patent No. 632,026, dated August 29, 1899.

Application filed March 23, 1899. Serial No. 710,246. (No model.)

*To all whom it may concern:*

Be it known that I, HARRY ERSKINE SMITH, a subject of Queen Victoria, and a resident of Chicago, county of Cook, State of Illinois, have invented a certain new and useful Improvement for Detecting Forgeries and Alterations in Valuable Documents, such as checks, notes, paper money, and the like, for the use more particularly of bank tellers, cashiers, accountants, &c., of which the following is a specification.

My improvement consists of a base, preferably surmounted by a closed case or camera, with a suitable provision for inserting and holding the document to be examined, a lens for magnifying with suitable lights, and reflectors for the illumination of the document.

The accompanying drawings show the general construction of my improvement.

Figure 1:
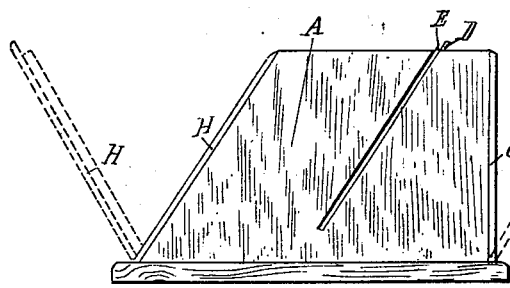
Figure 2:
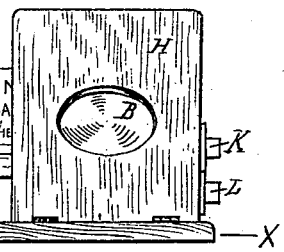
Figure 3:
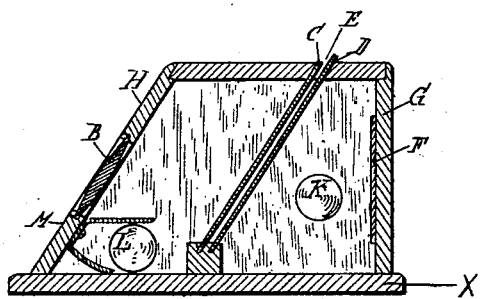
Figure 4:
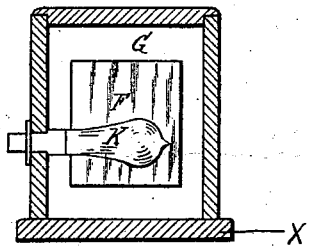
Figure 5:
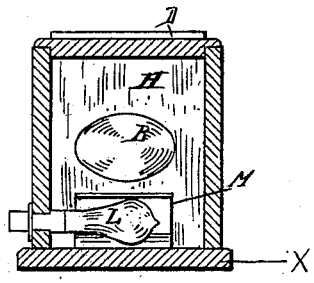

Figure 1 gives a general view, side elevation. Fig. 2 gives a front elevation. Fig. 3 gives a longitudinal section through center of camera. Fig. 4 gives a cross-section through the rear compartment. Fig. 5 gives a cross-section through the front compartment.

Similar letters refer to similar parts throughout the various drawings.

X represents the base or support for the various parts.

A represents the camera-case as a whole.

The document to be examined is inserted in the slot E between the transparent partitions C and D, which support the document to be examined. The light L, placed between the document and the lens, is intended to illuminate the surface of the document. The light K, placed back of the document relative to the lens B, is intended to throw a light through the material of which the document is made.

The reflectors M and F, while not essential, are of assistance in distributing the light, and the reflector M also serves as a screen to protect the lens B from the light.

While incandescent lights are shown in the drawings, it will be understood that other forms of light could be used equally well or that light could be reflected into the camera by means of prisms or mirrors to accomplish the illumination of the document.

The back and front G and H, while not necessarily removable, are preferably made so to facilitate attending to the lights K and L and cleaning the lens B and transparent partitions C and D.

In practice it is desirable frequently that the examination of the document should be made expeditiously and secretly, so that, for instance, if the apparatus were in use at a bank-teller's window the examination could be made without exciting the suspicions of a guilty party or embarrassing an innocent one. As the lights are entirely inside the camera-case and the lens would naturally face the teller, the document could be slipped into the aperture E without exciting notice.

The aperture E is preferably located at the focus of the lens B, so that no adjustment need be made for an examination.

I claim—

1. In an apparatus for examining documents the combination of a base, a camera-case, a lens, transparent supports with an aperture between them for receiving a document and means for illuminating the document inside the case.

2. In an apparatus for examining documents the combination of a case, a lens, parallel transparent supports with an aperture between them and means for illuminating the document inside the case consisting of a lamp and reflector on each side of the transparent supports.

3. In an apparatus for examining documents, the combination of a base, a camera-case, a lens, transparent supports with an aperture between them for receiving a document and means for illuminating the document inside the case, and hinged or removable ends.

HARRY ERSKINE SMITH.

Witnesses:
  LEO COX,
  MAURITZ PYK.